(12) United States Patent
Haba et al.

(10) Patent No.: US 10,152,583 B2
(45) Date of Patent: Dec. 11, 2018

(54) SECURITY INFORMATION UPDATE SYSTEM, INFORMATION PROCESSING APPARATUS, AND NON-TRANSITORY COMPUTER-READABLE RECORDING MEDIUM ENCODED WITH SECURITY INFORMATION UPDATE PROGRAM

(71) Applicant: Konica Minolta, Inc., Tokyo (JP)

(72) Inventors: Shoko Haba, Aichi (JP); Ryosuke Nishimura, Aichi (JP); Toshiya Shozaki, Osaka (JP); Tomoko Maruyama, Aichi (JP); Jun Shiraishi, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 115 days.

(21) Appl. No.: 15/284,183

(22) Filed: Oct. 3, 2016

(65) Prior Publication Data

US 2017/0098066 A1    Apr. 6, 2017

(30) Foreign Application Priority Data

Oct. 1, 2015    (JP) .................... 2015-195798

(51) Int. Cl.
*G06F 21/34*    (2013.01)
*H04L 29/06*    (2006.01)
(Continued)

(52) U.S. Cl.
CPC .............. *G06F 21/34* (2013.01); *G06F 21/41* (2013.01); *H04L 63/0428* (2013.01); *H04L 63/08* (2013.01); *H04L 63/104* (2013.01); *H04N 1/00344* (2013.01); *H04N 1/00347* (2013.01); *H04N 1/4413* (2013.01); *H04N 2201/0094* (2013.01)

(58) Field of Classification Search
CPC ..... G06F 21/34; G06F 21/41; H04L 63/0428; H04L 63/08; H04L 63/104; H04N 1/00344; H04N 1/00347; H04N 1/4413; H04N 2201/0094
See application file for complete search history.

(56) References Cited

U.S. PATENT DOCUMENTS 9,122,892 B2 * 9/2015 Kawabata ............... G06F 21/71
9,148,548 B2 * 9/2015 Nuggehalli ........... H04L 63/083
(Continued)

FOREIGN PATENT DOCUMENTS

JP    2007-142574 A    6/2007
JP    2014-120064 A    6/2014

*Primary Examiner* — Ayoub Alata
(74) *Attorney, Agent, or Firm* — Osha Liang LLP

(57) ABSTRACT

Each of the plurality of information processing apparatus includes an operation panel, a storage that stores security information, and a hardware processor. The hardware processor registers an administrator, when a user is registered as the administrator, authenticates the user, and when the user is authenticated, executes a first process of updating any of the stored security information, and a second process of setting the information processing apparatus in accordance with an operation by the authenticated user, and when the user is not registered as the administrator and is authenticated as an administrator in communicable another information processing apparatus, executes the first process but not the second process.

20 Claims, 11 Drawing Sheets

(51) Int. Cl.
*H04N 1/00* (2006.01)
*H04N 1/44* (2006.01)
*G06F 21/41* (2013.01)

(56) References Cited

U.S. PATENT DOCUMENTS

| | | | |
|---|---|---|---|
| 9,794,235 B2 * | 10/2017 | Anson | H04L 63/0442 |
| 2002/0124053 A1 * | 9/2002 | Adams | G06F 9/468 |
| | | | 709/216 |
| 2011/0145906 A1 * | 6/2011 | Morita | G06F 21/34 |
| | | | 726/7 |
| 2014/0230023 A1 * | 8/2014 | Parks | G06F 21/41 |
| | | | 726/4 |
| 2016/0371482 A1 * | 12/2016 | Suzuki | G06F 21/45 |

* cited by examiner

FIG. 2

| TYPE | REFERENCE DATE AND TIME |
|---|---|
| MAIL SERVER | EVERY MONTH, 1, 00:00 |
| DB SERVER | EVERY MONTH, 1, 00:00 |
| HDD ENCRYPTION | EVERY MONTH, 1, 00:00 |
| DATA ENCRYPTION | EVERY MONTH, 1, 00:00 |

F I G. 9
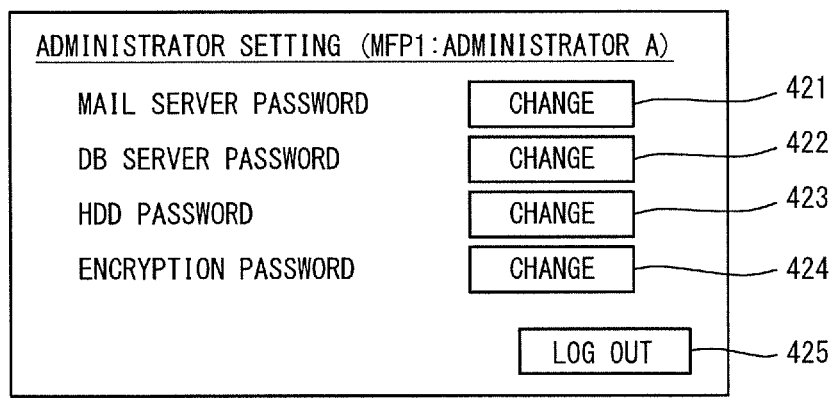

FIG. 11
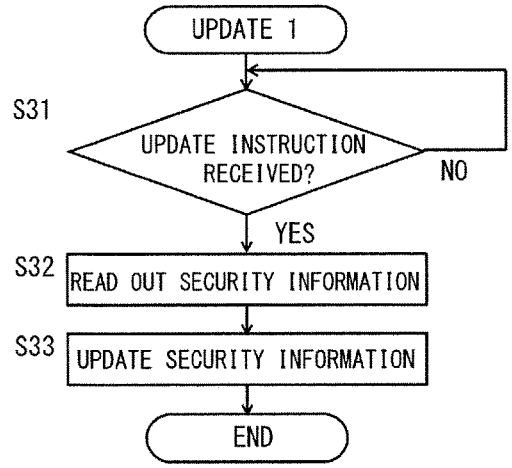
FIG. 12
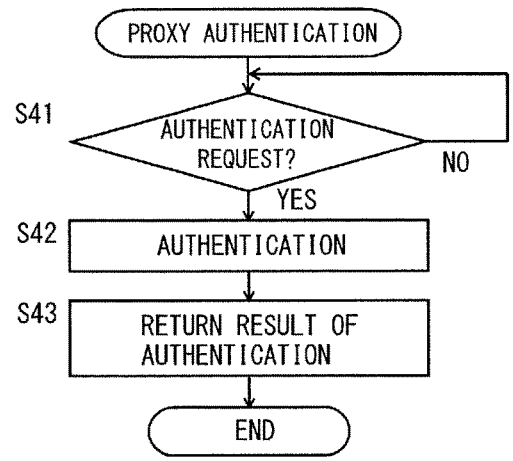
FIG. 13
| TYPE | REFERENCE DATE AND TIME | UPDATE DATE AND TIME |
|---|---|---|
| MAIL SERVER | EVERY MONTH, 1, 00:00 | EVERY MONTH, 2, 00:00 |
| DB SERVER | EVERY MONTH, 10, 00:00 | EVERY MONTH, 11, 00:00 |
| HDD ENCRYPTION | EVERY MONTH, 20, 00:00 | EVERY MONTH, 21, 00:00 |
| DATA ENCRYPTION | EVERY MONTH, 25, 00:00 | EVERY MONTH, 26, 00:00 |

SECURITY INFORMATION UPDATE SYSTEM, INFORMATION PROCESSING APPARATUS, AND NON-TRANSITORY COMPUTER-READABLE RECORDING MEDIUM ENCODED WITH SECURITY INFORMATION UPDATE PROGRAM

This application is based on Japanese Patent Application No. 2015-195798 filed with Japan Patent Office on Oct. 1, 2015, the entire content of which is hereby incorporated by reference.

BACKGROUND OF THE INVENTION

Field of the Invention

The present invention relates to a security information update system, an information processing apparatus, and a non-transitory computer-readable recording medium encoded with a security information update program. The present invention relates to a security information update system that administers pieces of security information respectively stored in a plurality of information processing apparatus, the information processing apparatus, and a non-transitory computer-readable recording medium encoded with the security information update program executed by the information processing apparatus.

Description of the Related Art

An image processing apparatus represented by a Multi Function Peripheral (hereinafter referred to as an MFP) sometimes communicates with an external device and executes a process in cooperation with the external device. In this case, a predetermined password is used between two or more devices in order for each of the two or more devices that communicate with each other to confirm the device at the other end of communication. Further, this password requires confidentiality, so that it is preferably administered by administrators who administer the image forming apparatus and changed regularly or irregularly. However, in the case where the password is changed, it is necessary to change the password in all of the plurality of image processing apparatus that store the password. For example, in the case where the same user does not administer all of the plurality of image forming apparatus, a plurality of users must respectively change the password. However, if any one of the plurality of users does not change the password, the password is not changed in all of the image forming apparatus.

In Japanese Patent Laid-Open No. 2014-120064, a technology for transmitting default user information set in one of a plurality of image scanning devices to another image scanning device by an administrator and performing setting is described. However, because a password itself is transmitted and received in the technology described in Japanese Patent Laid-Open No. 2014-120064A, the password may leak.

Further, in Japanese Patent Laid-Open No. 2007-142574, an image forming apparatus that includes an authentication means for performing authentication of an individual based on authentication information including a password and the like stored in advance, and a limitation means for limiting the usage of functions based on usage limitation information with regard to the usage of the functions, characterized in that the image forming apparatus is capable of executing the authentication means for an authentication request from another image forming apparatus connected via a network. In the technology described in Japanese Patent Laid-Open No. 2007-142574, a process, which the user who is not registered in an image forming apparatus can allow the image forming apparatus to execute, is defined by the function of which the usage is not limited in the image forming apparatus or the image forming apparatus that has authenticated the user. Therefore, the user can use all of a plurality of image forming apparatus within a range defined by the usage limitation information set in any of the plurality of image forming apparatus. However, in each of the plurality of image forming apparatus, a process, which can be executed by the user who is not registered in the image forming apparatus, must be registered in any one of the plurality of image forming apparatus. Thus, the setting becomes complicated.

SUMMARY OF THE INVENTION

According to one aspect of the present invention, a security information management system that includes a plurality of information processing apparatus, wherein each of the plurality of information processing apparatus comprises: an operation panel that accepts an operation by a user; a storage that stores security information; and a hardware processor, wherein the hardware processor registers an administrator of the information processing apparatus, when a user who operates the operation panel is registered as the administrator, authenticates the user, when the user is authenticated, executes a first process of updating any of the stored security information, and a second process of setting the information processing apparatus in accordance with an operation that is performed by the authenticated user and accepted by the operation panel, and when the user is not registered as the administrator of the information processing apparatus and is authenticated as an administrator in communicable another information processing apparatus, executes the first process but not the second process. The term "when" is used herein to mean "in the event that" or "in a case where," as opposed to a single point in time.

According to another aspect of the present invention, an information processing apparatus includes an operation panel that accepts an operation by a user; a storage that stores security information; and a hardware processor, wherein the hardware processor: registers an administrator; when a user who operates the operation panel is registered as the administrator, authenticates the user; when the user is authenticated, executes a first process of updating any of the stored security information, and a second process of setting the information processing apparatus in accordance with an operation that is performed by the authenticated user and accepted by the operation panel; and when the user is not registered as the administrator and is authenticated as an administrator in communicable another information processing apparatus, executes the first process but not the second process.

According to yet another aspect of the present invention, a non-transitory computer-readable recording medium encoded with a security information update program executed by a hardware processor that controls an information processing apparatus, the information processing apparatus comprising: an operation panel that accepts an operation by a user; and a storage that stores security information, the security information update program causes the hardware processor to execute: registering an administrator; when a user who operates the operation panel is registered as an administrator, authenticating the user; when the user is authenticated, executing a first process of updating any of the stored security information, and a second process of setting the information processing apparatus in accordance with an operation that is performed by the authenticated user and accepted by the operation panel; and when the user is not registered as the administrator and is authenticated as an administrator in communicable another information processing apparatus, executing the first process but not the second process.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a diagram showing one example of a policy table in one or more embodiments of the invention;

FIG. 9 is a diagram showing one example of a process limitation screen in one or more embodiments of the invention;

FIG. 11 is a flow chart showing one example of a flow of an update process in one or more embodiments of the invention;

FIG. 12 is a flow chart showing one example of a flow of a proxy authentication process in one or more embodiments of the invention;

FIG. 13 is a diagram showing one example of a policy table in one or more embodiments of a first modified example of the invention;

DETAILED DESCRIPTION

Figure 1:
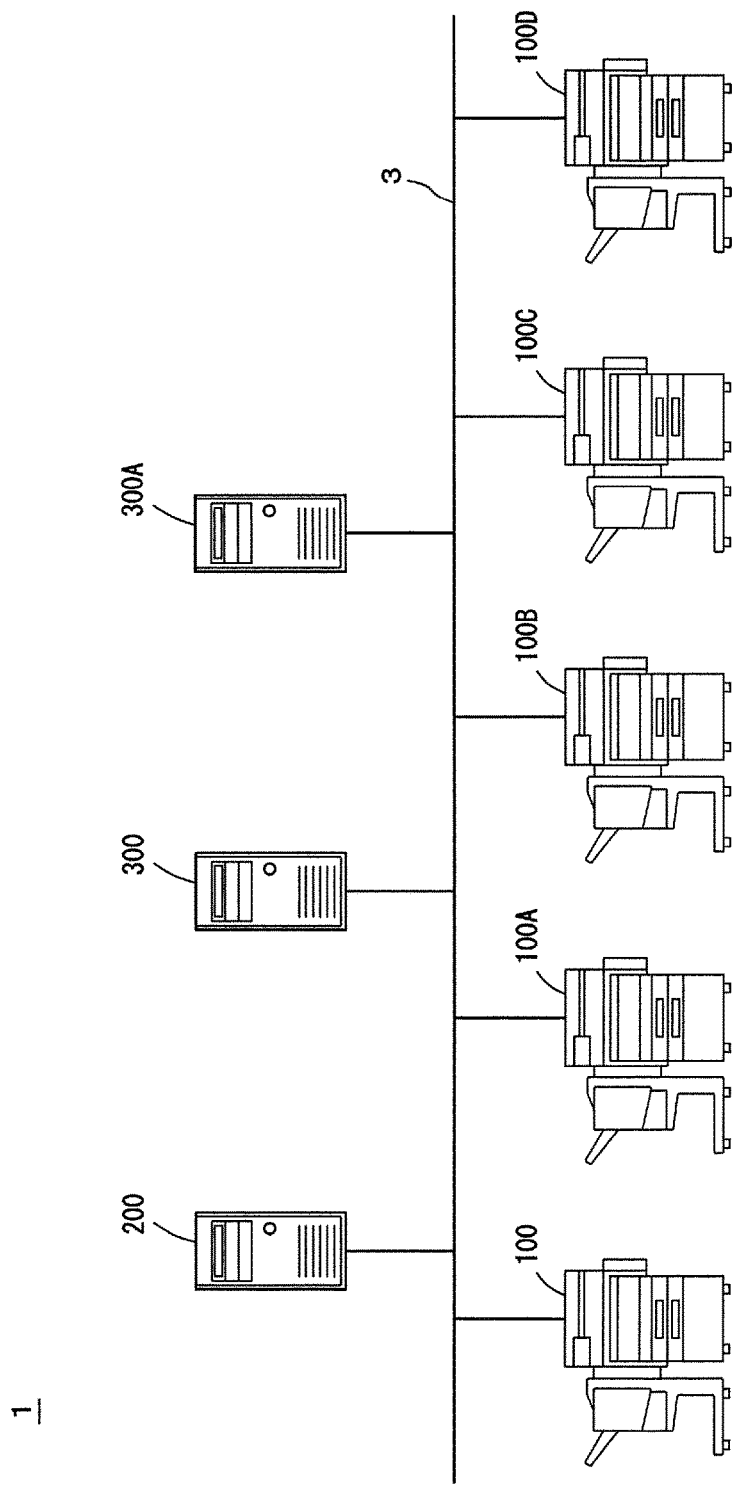
FIG. 1 is a diagram showing one example of an overview of a security information update system in one or more embodiments of the invention.

Embodiments of the present invention will be described below with reference to the drawings. In the following description, the same or corresponding parts are denoted by the same reference characters. Their names and functions are also the same. Thus, a detailed description thereof will not be repeated.

FIG. 1 is a diagram showing one example of an overview of a security information update system in one or more embodiments of the invention. Referring to FIG. 1, the security information update system 1 includes a management server 200, service provision servers 300, 300A, and MFPs (Multi Function Peripherals) 100, 100A to 100D. The management server 200, the service provision servers 300, 300A, and the MFPs 100, 100A to 100D are respectively connected to a network 3. The network 3 is a local area network (LAN), for example. Therefore, the management server 200, the service provision servers 300, 300A and the MFPs 100, 100A to 100D can communicate with one another. Each of the MFPs 100, 100A to 100D and the service provision servers 300, 300A is one example of an information processing apparatus. Each of the MFPs 100, 100A to 100D has the same hardware configurations and the functions. Therefore, the MFP 100 is described here as an example unless otherwise stated.

While the network 3 is specified here as the LAN, the network 3 is not limited to the LAN. The network 3 may be the internet, a Wide Area Network (WAN), a network using the Public Switched Telephone Network (PSTN) or the like.

Each of the service provision servers 300, 300A is one example of the information processing apparatus, and a computer that provides predetermined services. The service provision server 300 functions here as a mail server that provides a service of transmitting and receiving electronic mails, and the service provision server 300A functions here as a database server (hereinafter referred to as a DB server) that provides a database. The service provided by each of the service provision servers 300, 300A is not limited to the above, and may be other services.

Each of the service provision servers 300, 300A provides a service on the condition that authentication of a device or a user that has accessed each of the service provision servers 300, 300A is successful in order to increase the security. Specifically, a set of identification information and security information is registered in advance in each of the service provision servers 300, 300A, and each of the service provision servers 300, 300A provides a service to the device that has transmitted the set of the registered identification information and the registered security information. The identification information stored in each of the service provision servers 300, 300A is an account for identifying the device or the user that accesses each of the service provision servers 300, 300A, and the security information is an administrator password. Each of the MFPs 100, 100A to 100D here stores the set of the identification information and the security information registered for each of the service provision servers 300, 300A. In other words, each of the MFPs 100, 100A to 100D stores the set of the identification information and the security information registered in the service provision server 300, and each of the MFPs 100, 100A to 100D stores the set of the identification information and the security information registered in the service provision server 300A. Therefore, classification into a first group composed of the MFPs 100, 100A to 100D and the service provision server 300, and a second group composed of the MFPs 100, 100A to 100D and the service provision server 300A is made. The same set of the identification information and the security information is stored in each of the MFPs 100, 100A to 100D, and the service provision server 300, which are classified as being in the first group, and the same set of the identification information and the security information is stored in each of the MFPs 100, 100A to 100D, and the service provision server 300A, which are classified as being in the second group. The identification information corresponding to the first group and the identification information corresponding to the second group are different from each other.

For example, when receiving the service provided by the service provision server 300 that belongs to the first group, the MFP 100 transmits the set of the identification information and the security information corresponding to the first group to the service provision server 300. If the set of the identification information and the security information received from the MFP 100 is registered in the service provision server 300, the service provision server 300 authenticates the MFP 100. The service provision server 300 provides the MFP 100 with the service on the condition that the authentication is successful. Further, when receiving the service provided by the service provision server 300A that belongs to the second group, the MFP 100 transmits the set of the identification information and the security information corresponding to the second group to the service provision server 300A. If the set of the identification information and the security information received from the MFP 100 is registered in the service provision server 300A, the service provision server 300A authenticates the MFP 100. The service provision server 300A provides the MFP 100 with the service on the condition that the authentication is successful.

Further, the MFPs 100, 100A to 100D share a predetermined region of an HDD included in each of the MFPs 100, 100A to 100D. In this case, each of the MFPs 100, 100A to 100D, on the condition that authentication of a device or a user that accesses the region set to be shared in the HDD 115 (see FIG. 3) is successful in order to increase the security, permits an access to the region. Specifically, the security information for accessing the HDD 115 is registered in advance in each of the MFPs 100, 100A to 100D, and each of the MFPs 100, 100A to 100D permits the device that has transmitted the registered security information to access the region set to be shared in the HDD 115. The security information in this case is the administrator password, and is the same among the MFPs 100, 100A to 100D.

Further, when transmitting and receiving data, each of the MFPs 100, 100A to 100D encrypts the data in order to increase the security, and transmits and receives the data. Each of the MFPs 100, 100A to 100D stores a password used for this encryption as the security information. Specifically, each of the MFPs 100, 100A to 100D encrypts the data by using the security information in transmitting the data, and decrypts the data by using the security information in receiving the data. The security information in this case is the same among the MFPs 100, 100A to 100D.

The management server 200 administers the security information stored in each of the service provision servers 300, 300A and the MFPs 100, 100A to 100D. Specifically, the management server 200 defines a security policy defining the date and time, which is the reference for the update, for every piece of the security information. The security policy defines the reference date and time for every piece of the security information. Specifically, a user who operates the management server 200 inputs the reference date and time for every piece of the security information in the management server 200. Thus, a policy table that defines the reference date and time for every piece of the security information is stored in the management server 200.

FIG. 2 is a diagram showing one example of the policy table in one or more embodiments of the invention. Referring to FIG. 2, the policy table includes four security records. Each security record includes an item of a type, and an item of the reference date and time. In the item of the type, the identification information for identifying the type of the security information is set. In the item of the reference date and time, the date and time that are the reference for the update of the security information are set. In the security record in the first line, the identification information "MAIL SERVER" is set in the item of the type, and "EVERY MONTH, 1, 00:00" is set in the item of the reference date and time. The identification information "MAIL SERVER" is an account registered in the service provision server 300, which is an electronic mail server. In the security record in the second line, the identification information "DB SERVER" is set in the item of the type, and "EVERY MONTH, 1, 00:00" is set in the item of the reference date and time. The identification information "DB SERVER" is an account registered in the service provision server 300A, which is the DB server.

In the security record in the third line, the identification information "HDD ENCRYPTION" is set in the item of the type, and "EVERY MONTH, 1, 00:00" is set in the item of the reference date and time. The identification information "HDD ENCRYPTION" is the information for identifying the security information for accessing the HDD. In the security record in the fourth line, the identification information "DATA ENCRYPTION" is set in the item of the type, and "EVERY MONTH, 1, 00:00" is set in the item of the reference date and time. The identification information "DATA ENCRYPTION" is the information for identifying the security information for encryption or decryption of the data.

In the case where the security information to which the reference date and time, which are defined by the policy table and the current date and time have passed, correspond is present the management server 200 transmits an electronic mail including a message that gives an instruction to update the security information, the identification information for identifying the security information, and the updated security information to a user who administers each of the service provision servers 300, 300A and the MFPs 100, 100A to 100D.

Figure 3:
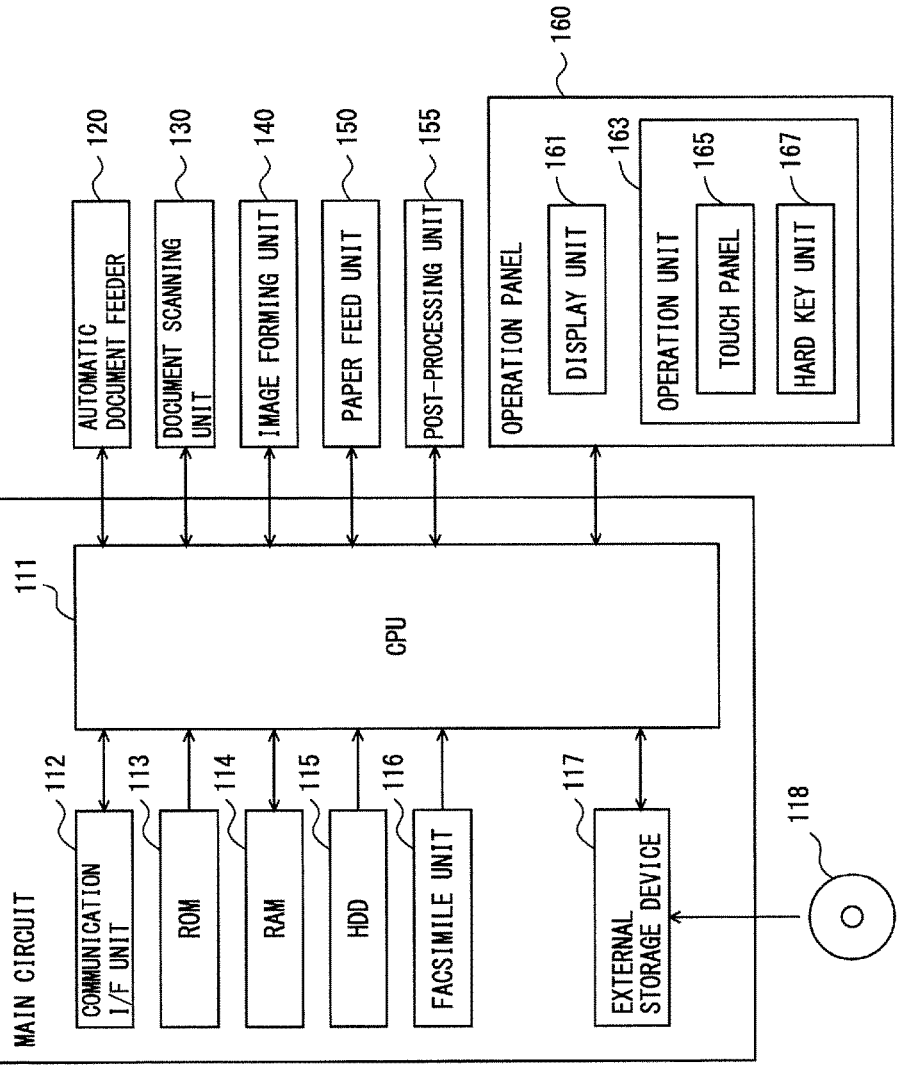
FIG. 3 is a block diagram showing one example of an outline of hardware configurations of an MFP in one or more embodiments of the invention.

FIG. 3 is a block diagram showing one example of an outline of the hardware configurations of the MFP in one or more embodiments of the invention. Referring to FIG. 3, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data scanned and output by the document scanning unit 130, a paper feed unit 150 for supplying a sheet of paper to the image forming unit 140, a post-processing unit 155 for processing a sheet of paper on which an image is formed, and an operation panel 160 serving as a user interface.

The post-processing unit 155 performs a sorting process of sorting and discharging one or more sheets of paper on which images have been formed by image forming unit 140, a hole-punching process of punching the sheets, and a stapling process of stapling the sheets.

The main circuit 110 includes a hardware processor or CPU (Central Processing Unit) 111, a communication interface (I/F) unit 112, a ROM (Read Only Memory) 113, a RAM (Random Access Memory) 114, and a hard disk drive (HDD) 115 used as a mass storage device, a facsimile unit 116, and an external storage device 117 on which a CD-ROM (Compact Disk ROM) 118 is mounted. The CPU 111 is connected to the automatic document feeder 120, the document scanning unit 130, the image forming unit 140, the paper feed unit 150, the post-processing unit 155, and the operation panel 160, and controls the entire MFP 100.

The ROM 113 stores a program executed by the CPU 111 or necessary data for executing the program. The RAM 114 is used as a work area when the CPU 111 executes the program. Further, the RAM 114 temporarily stores scan data (image data) successively sent from the document scanning unit 130.

The operation panel 160, which is provided on an upper surface of the MFP 100, includes a display unit 161 and an operation unit 163. The display unit 161 is a display device such as a liquid crystal display device (LCD) or an organic ELD (Electro-Luminescence Display), and displays an instruction menu for the user, information about acquired image data, and others. The operation unit 163 includes a hard key unit 167 having a plurality of keys, and accepts input data such as each type of an instruction, characters, and numerical characters by the key operations of the user. The operation unit 163 further includes a touch panel 165 disposed on the display unit 161.

The facsimile unit 116 is connected to the public switched telephone networks (PSTN), and transmits or receives facsimile data in accordance with a communication procedure of the facsimile.

The communication I/F unit 120 is an interface for connecting the MFP 100 to the LAN 3. The case where the communication I/F unit 112 transmits and receives data by a communication procedure of a TCP (Transmission Control Protocol) will be described here. While the TCP is described here as one example of the communication procedure, the communication procedure for transmitting and receiving data via the communication I/F unit 112 is not limited to the TCP. For example, the communication procedure may be a UDP (User Datagram Protocol). The CPU 111 communicates with a device connected to the LAN 3 via the communication I/F unit 112, and transmits and receives data. Further, in the case where the LAN 3 is connected to the internet, the communication I/F unit 112 can communicate with the computer connected to the internet.

The HDD 115 has a plurality of storage regions. At least one of the plurality of storage regions is set to be shared, and a password is set. Each of the other MFPs 100A to 100D, the management server 200, the service provision servers 300, 300A can access the storage region set to be shared in the HDD 115 by transmitting the password set for the HDD 155 to the MFP 100.

The external storage device 117 is mounted with the CD-ROM 118. The CPU 111 can access the CD-ROM 118 via the external storage device 117. The CPU 111 loads the program recorded in the CD-ROM 118, which is mounted on the external storage device 117, into the RAM 114 for execution. The medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

Further, the CPU 111 may load the program stored in the HDD 115 into the RAM 114 for execution. In this case, another computer connected to the network 3 or the internet may rewrite the program stored in the HDD 115 of the MFP 100, or may additionally write a new program therein. Further, the MFP 100 may download a program from another computer connected to the network 3 or the internet, and store the program in the HDD 115. The program referred to here includes not only a program directly executable by the CPU 111 but also a source program, a compressed program, an encrypted program and the like.

Figure 4:
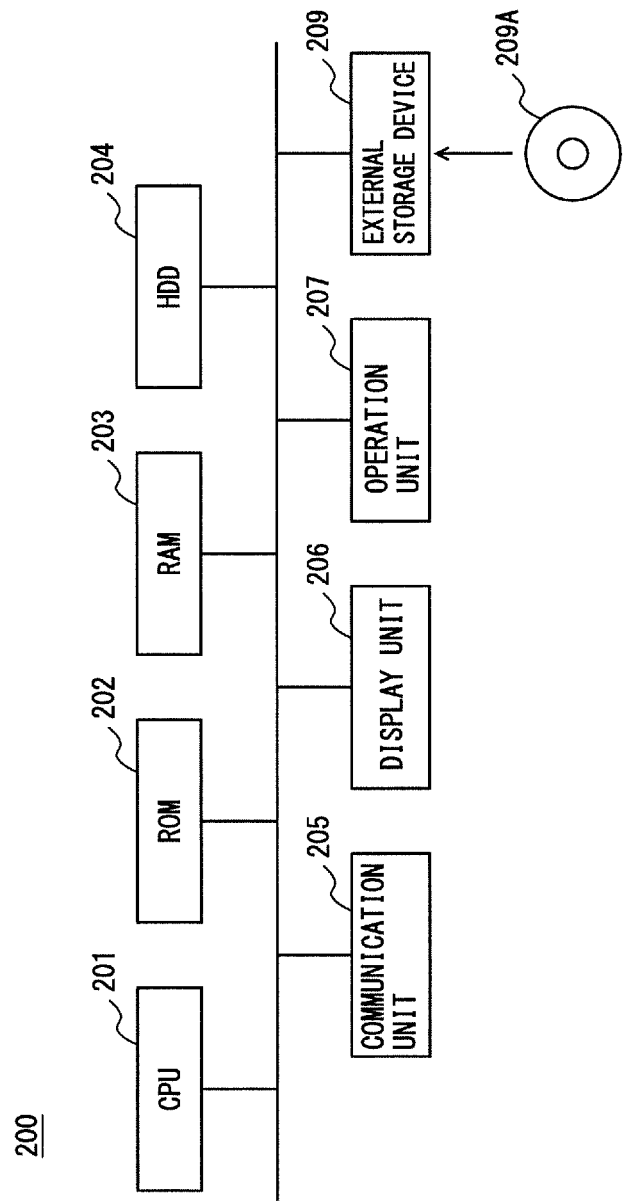
FIG. 4 is a block diagram showing one example of an outline of hardware configurations of a management server in one or more embodiments of the invention.

FIG. 4 is a block diagram showing one example of an outline of hardware configurations of the management server in one or more embodiments of the invention. Referring to FIG. 4, the management server 200 includes a CPU 201 for controlling the entire management server 200, a ROM 202 for storing a program to be executed by the CPU 201, a RAM 203 used as a work area of the CPU 201, an HDD 204 that stores data in a nonvolatile manner, a communication unit 205 that connects the CPU 201 to the LAN 3, a display unit 206 that displays information, an operation unit 207 that accepts an input operation by the user, and an external storage device 209.

The external storage device 209 is mounted with the CD-ROM 209A. The CPU 201 can access the CD-ROM 209A via the external storage device 209. The CPU 201 loads the program recorded in the CD-ROM 209A, which is mounted on the external storage device 209, into the RAM 203 for execution. The medium for storing a program executed by the CPU 201 is not limited to the CD-ROM 209A. It may be an optical disc, an IC card, an optical card, or a semiconductor memory such as a mask ROM, an EPROM, or an EEPROM.

Further, the program executed by the CPU 201 is not limited to the program recorded in the CD-ROM 209A, and the program stored in the HDD 204 may be loaded into the RAM 203 for execution. In this case, another computer connected to the network 3 or the internet may rewrite the program stored in the HDD 204 of the management server 200, or may additionally write a new program therein. Further, the management server 200 may download a program from another computer connected to the network 3 or the internet, and store the program in the HDD 204. The program referred to here includes not only a program directly executable by the CPU 201 but also a source program, a compressed program, an encrypted program and the like.

Figure 5:
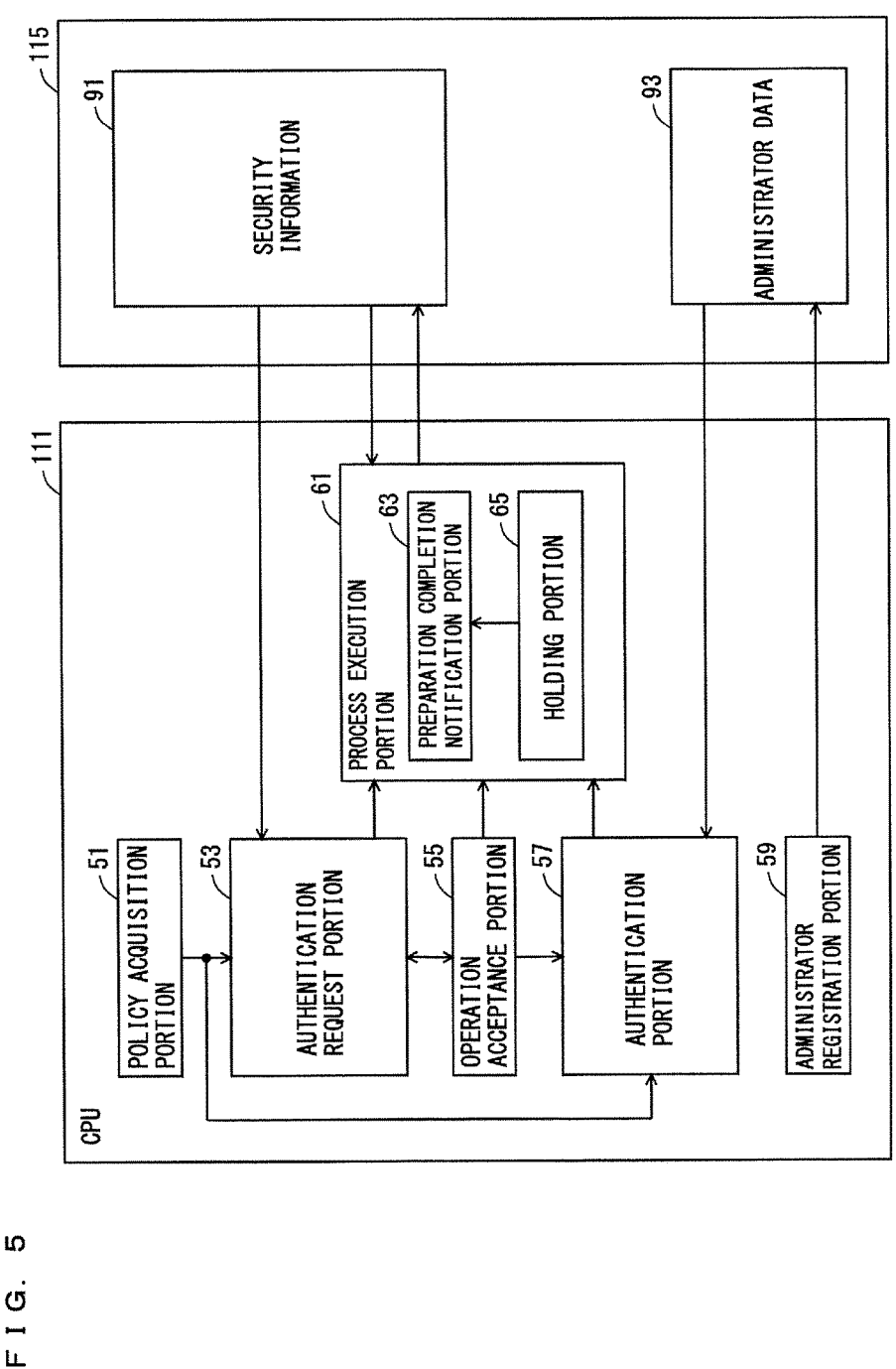
FIG. 5 is a block diagram showing one example of functions of a CPU included in the MFP in one or more embodiments of the invention together with information stored in an HDD.

FIG. 5 is a block diagram showing one example of the functions of the CPU included in the MFP in one or more embodiments of the invention together with the information stored in the HDD. The functions shown in FIG. 5 are formed in the CPU 111 in the case where the CPU 111 included in the MFP 100 executes a security information update program stored in the ROM 113, the HDD 115 or the CD-ROM 118. Referring to FIG. 5, the CPU 111 included in the MFP 100 includes a policy acquisition portion 51, an authority request portion 53, an operation acceptance portion 55, an authentication portion 57, an administrator registration portion 59, and a process execution portion 61.

Security information 91 is stored in the HDD 115. The pieces of security information 91 include a piece of the security information used for authentication by the service provision server 300, a piece of the security information used for authentication by the service provision server 300A, a piece of the security information for accessing a shared region in the HDD 115, and a piece of the security information for encryption and decryption of data. The security information used for the authentication by the service provision server 300 corresponds to the identification information of an account registered in the service provision server 300, and makes a set with the account. The security information used for the authentication by the service provision server 300A, which is the DB server, corresponds to the identification information of an account registered in the service provision server 300A, which is the DB server, and makes a set with the account. The security information for accessing the shared region in the HDD 15 corresponds to the identification information for identifying the security information for accessing the HDD 115, and makes a set with the identification information. The security information for encryption or decryption of the data corresponds to the identification information for identifying the security information for encryption or decryption of the data, and makes a set with the identification information.

The policy acquisition portion 51 acquires the security policy from the management server 200. A network address of the management server 200 is stored in the HDD 115, and the policy acquisition portion 51 requests the management server 200 via the communication I/F unit 112 to transmit the security policy. When the MFP 100 requests the security policy, the management server 200 transmits the policy table stored in the HDD 205 to the MFP 100. Thus, when the communication I/F unit 112 receives the policy table transmitted by the management server 200, the policy acquisition portion 51 acquires the policy table. The policy acquisition portion 51 outputs the acquired policy table to the authentication portion 57 and the authentication request portion 53. The policy acquisition portion 51 may acquire the policy table at a predetermined time, or may acquire the policy table when the user operates the MFP 100. Although the predetermined time is not limited, the predetermined time is the time when power is applied to the MFP 100, or a predetermined time of every day, for example.

The administrator registration portion 59 registers a user who administers the MFP 100 as an administrator. Specifically, the administrator registration portion 59 displays an administrator registration screen in the display unit 161, accepts an administrator password that is input by the user who operates the MFP 100 in the operation unit 163 in accordance with the administrator registration screen, and stores the administrator password in the HDD 115 as administrator data 93. The administrator registration portion 59 only registers the administrator password and does not register the information that specifies the user. In other words, the administrator registered by the administrator registration portion 59 is the user who knows the registered administrator password. Therefore, in the case where a plurality of users know the administrator password, the plurality of users who know the administrator password are registered as the administrators by the administrator registration portion 59. A user account of the user may be registered in addition to the password. The user account is the identification information for identifying the user. In this case, the administrator registration portion 59 may register the plurality of users as the administrators of the MFP 100. Specifically, a set of the user account and the administrator password is stored as the administrator data 93 for every plurality of users.

The operation acceptance portion 55 controls the operation unit 163, and outputs an operation input in the operation unit 163 to the authentication portion 57 and the process execution portion 61.

The authentication portion 57 performs the authentication of the user who operates the MFP 100. Specifically, the authentication portion 57 determines whether the security information that has not been updated even though the current date and time has passed its reference date and time is present with reference to the policy table received from the policy acquisition portion 51. In the case where the security information that has not been updated even though the current date and time has passed its reference date and time is not present, the authentication portion 57 displays a first administrator log-in screen in the display unit 161.

Figure 6:
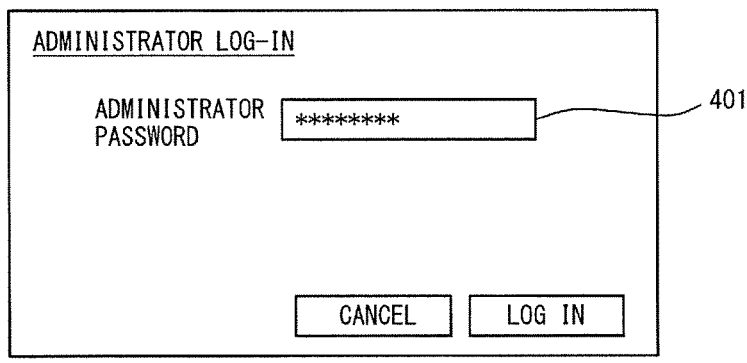
FIG. 6 is a diagram showing one example of a first administrator log-in screen in one or more embodiments of the invention.

FIG. 6 is a diagram showing one example of the first administrator log-in screen in one or more embodiments of the invention. Referring to FIG. 6, the first administrator log-in screen 400 includes a region 401 for an input of the administrator password.

Returning to FIG. 5, the authentication portion 57 accepts an administrator password input in the operation unit 163 by the user who operates the operation unit 163 of the MFP 100 in accordance with the first administrator log-in screen, and compares the administrator password with the administrator data 93 stored in the HDD 115. If the administrator password accepted by the operation unit 163 is the same as the administrator data 93, the authentication portion 57 determines that the user is registered as the administrator, and authenticates the user. If not, the authentication portion 57 determines that the user is not registered as the administrator, and does not authenticate the user. In the case where authenticating the user who operates the operation unit 163, the authentication portion 57 outputs execution permission indicating that the administrator has been authenticated to the process execution portion 61. In the case where the administrator password input in the operation unit 163 matches the administrator data 93, the authentication portion 57 authenticates the user who operates the operation unit 163. Therefore, the authentication portion 57 does not specify the user who operates the operation unit 163. In the case where the administrator data 93 includes a set of a user account and an administrator password, the authentication portion 57 may accept the user account of the user who operates the operation unit 163 and the password in order to specify the user who operates the operation unit 163. Further, in the case where the communication I/F unit 112 receives an authentication request from any of the other MFPs 100A to 100D, the authentication portion 57 performs the authentication of the user. The case where the communication I/F unit 112 receives the authentication request from the MFP 100A is described here as an example. The authentication request received from the MFP 100A includes an administrator password input by a user who operates the MFP 100A. Specifically, when the communication I/F unit 112 receives the authentication request from the MFP 100A, the authentication portion 57 compares the administrator password included in the authentication request with the administrator data 93 stored in the HDD 115. If the administrator password included in the authentication request and the administrator data 93 are the same, the authentication portion 57 determines that the user who operates the MFP 100A is registered as the administrator of the MFP 100, and authenticates the user. If not, the authentication portion 57 determines that the user who operates the MFP 100A is not registered as the administrator in the MFP 100, and does not authenticate the user. The authentication portion 57 transmits a result of authentication via the communication I/F unit 112 to the MFP 100A that has transmitted the authentication request.

The authentication request portion 53 performs the authentication of the user who operates the MFP 100. Specifically, the authentication request portion 53 determines whether the security information that has not been updated even though the current date and time have passed its update date and time is present with reference to the policy table received from the policy acquisition portion 51. In the case where the security information that has not been updated even though the current date and time have passed its update date and time present, the authentication request portion 53 displays a second administrator log-in screen in the display unit 161.

Figure 7:
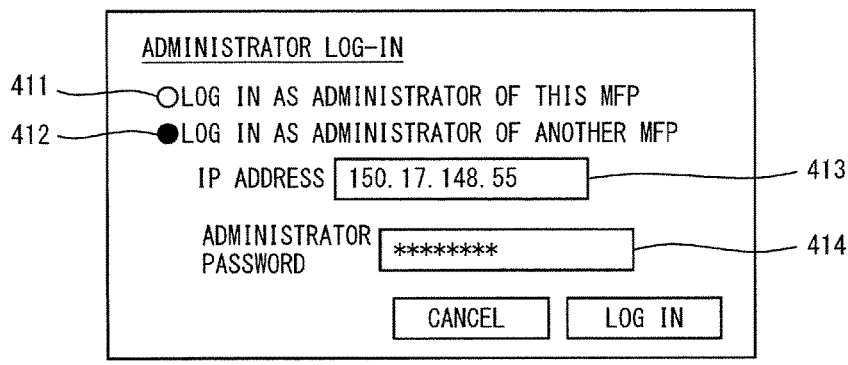
FIG. 7 is a diagram showing one example of a second administrator log-in screen in one or more embodiments of the invention.

FIG. 7 is a diagram showing one example of the second administrator log-in screen in one or more embodiments of the invention. Referring to FIG. 7, the second administrator log-in screen 410 includes radio buttons 411, 412, a region 413 for an input of device identification information for identifying any of the MFPs 100A to 100D, and a region 414 for an input of an administrator password. Each of the radio buttons 411, 412 can be selected exclusively, and any one of the radio buttons 411, 412 can be designated. The radio button 411 is a button for giving an instruction in the case where the user who operates the MFP 100 is registered as the administrator of the MFP 100. In the case where the radio button 411 is designated, the region 413 becomes invalid, and the region 414 becomes valid. In the case where the region 413 is invalid, the device identification information cannot be input in the region 413.

The radio button 412 is a button for giving an instruction in the case where the user who operates the MFP 100 is not registered as the administrator in the MFP 100. If the user who operates the MFP 100 designates the radio button 412, the region 413 and the region 414 become valid. For example, in the case where a user A who is not registered as the administrator in the MFP 100 but registered as the administrator of the MFP 100A operates the MFP 100, the user A can designate the radio button 412, input an IP (Internet Protocol) address assigned to the MFP 100A as the device identification information of the MFP 100A in the region 413, and input the administrator password registered in the MFP 100A in the region 414. While the device identification information of the MFP 100A is specified here as an IP address, the device identification information is not limited to this. As long as the MFP 100A can be identified, the device identification information may be a name assigned to the MFP 100A, or a network address such a URL (Uniform Resource Locator), for example.

Returning to FIG. 5, the authentication request portion 53 accepts the device identification information for identifying an external device and the administrator password that are input in the operation unit 163 by the user who operates the MFP 100 in accordance with the second administrator log-in screen 410. The external device is a device in which the user who operates the MFP 100 is registered as an administrator. The external device is the device in which the user who operates the MFP 100 is registered as the administrator, and includes a portable information device such as a smartphone carried by the user who operates the MFP 100 or a personal computer used by the user who operates the MFP 100 in addition to the MFPs 100, 100A to 100D.

For example, the case where the user registered as the administrator in the MFP 100A operates the MFP 100 will be described as an example. The authentication request portion 53 displays the second administrator log-in screen 412. When the user registered as the administrator in the MFP 100A inputs the device identification information of the MFP 100A and the administrator password registered in the MFP 100A in accordance with the second administrator log-in screen 412, the authentication request portion 53 transmits the authentication request including the input administrator password to the MFP 100A via the communication I/F unit 112.

In the MFP 100A that receives the authentication request, the authentication portion 57 of the CPU 111 included in the MFP 100A determines whether the user is the administrator registered in the MFP 100A by using the administrator password included in the authentication request, and returns a result of authentication. In the case where the communication I/F unit 112 acquires the result of authentication received from the MFP 100A, and the result of authentication indicates authentication success, the authentication request portion 53 outputs the execution permission indicating that the user has been authenticated by another device to the process execution portion 61. In the case where the result of authentication indicates authentication failure, the authentication request portion 53 does not output the execution permission to the process execution portion 61.

In response to acceptance of an operation by the operation acceptance portion 55 after the receipt of the execution permission from the authentication portion 57, the process execution portion 61 executes a process corresponding to the accepted operation. Specifically, the process execution portion 61 displays an administrator setting screen for accepting an execution instruction of a process in the display unit 161, and executes a process in accordance with an operation, which is input by the user in accordance with the administrator setting screen and accepted by the operation unit 163. The process that can be executed by the process execution portion 61 after the receipt of the execution permission from the authentication portion 57 includes a first process of updating the security information 91 stored in the HDD 115, and a second process, which is not the first process, of setting a setting value used for execution of each type of a process. In the case where an operation is accepted by the operation acceptance portion 55 after the receipt of the execution permission from the authentication portion 57, the process execution portion 61 executes the first process or the second process. The first process is also referred to as a security information update process.

The second process includes an environment setting process, a network setting process, a copy setting process, a printer setting process, and a scan setting process, for example. The environment setting process is a process of setting a setting value that determines the environment in which the MFP 100 is used. The setting value that determines the environment includes the year, month and day, a type of the display language, presence and absence of a shift to a power saving mode, for example. The network setting process is a process of setting a setting value used for execution of a communication process of transmitting and receiving data by the communication I/F unit 112. The setting value used for the execution of the communication process is an IP address assigned to the image processing apparatus, a communication method, an encryption method, for example. The copy setting process is a process of setting a setting value used for execution of a copying process of forming an image scanned from the document on a sheet of paper. The setting value used for the execution of the copying process includes a value that defines whether a size of the document scanned by the document scanning unit 130 is automatically detected, for example. The printer setting process is a process of setting a setting value used for execution of a printing process of printing print data. The setting value used for the execution of the printing process includes a timeout time period, which is a period of time until the print data is received, and a value that defines whether an image that makes notification of an error is printed at the time of an occurrence of an error. The scan setting process is a process of setting a setting value used for execution of a scanning process of scanning a document. The setting value used for the execution of the scanning process includes a value that specifies the destination to which the scanned image is transmitted.

As long as the second process is other than the first process, the second process is not limited to the process of setting the setting value used for execution of each type of a process, and may include all processes that can be executed by the process execution portion 61.

Figure 8:
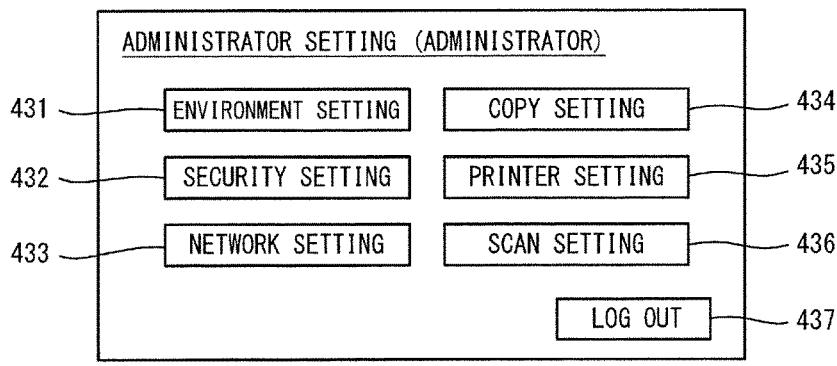
FIG. 8 is a diagram showing one example of an administrator setting screen in one or more embodiments of the invention.

In the case where the execution permission is input from the authentication request portion 53, and then an operation is accepted by the operation acceptance portion 55, the process execution portion 61 executes only the first process. Even in the case where having received the execution permission from authentication request portion 53, the process execution portion 61 does not execute the second process. Specifically, the process execution portion 61 displays a process limitation screen for accepting only the execution of the first process in the display unit 161, and executes the first process in accordance with the operation, which is input by the user in accordance with the process limitation screen and accepted by the operation unit 163. The administrator setting screen is a screen in which the first process and the second process can executed, and the process limitation screen is a screen in which only the first process can be executed. FIG. 8 is a diagram showing one example of the administrator setting screen in one or more embodiments of the invention. Referring to FIG. 8, the administrator setting screen 430 includes a button 431 for giving an instruction to display the environment setting screen for setting a setting value set in the environment setting process, a button 432 for giving an instruction to display a security information setting screen for setting the security information, a button 433 for giving an instruction to display a network setting screen for setting a setting value set in the network setting process, a button 434 for giving an instruction to display an environment setting screen for setting a setting value set in the copy setting screen, a button 435 for giving an instruction to display a printer setting screen for setting a setting value set in the printer setting process, a button 436 for giving an instruction to display a scan setting screen for setting a setting value set in the scan setting process, and a button 437 in which "log-out" is displayed. The security setting screen is the same as the process limitation screen.

FIG. 9 is a diagram showing one example of the process limitation screen in one or more embodiments of the invention. Referring to FIG. 9, the process limitation screen 420 includes a button 421 for giving an instruction to change the security information specified by the account registered in the service provision server 300, which is an electronic mail server, a button 422 for giving an instruction to change the security information specified by the account registered in the service provision server 300A, which is the DB server, a button 423 for giving an instruction to change the security information for accessing the shared region in the HDD 115, a button 424 for giving an instruction to change the security information for encryption or decryption of data, and a button 425 in which "log-out" is displayed.

In the case where the current date and time have passed the reference date and time, and the corresponding security information has not been updated, each of the buttons 421 to 424 becomes valid. In the case where the current date and time have passed the reference date and time, and the corresponding security information has been updated, each of the buttons 421 to 424 becomes invalid. Specifically, in the case where the security information that makes a set with the identification information "MAIL SERVER" of the security information 91 stored in the HDD 115 has not been updated after the reference date and time, the button 421 becomes valid. In the case where the security information that makes a set with the identification information "MAIL SERVER" of the security information 91 stored in the HDD 115 has been updated after the reference date and time, the button 421 becomes invalid. In the case where the security information that makes a set with the identification information "DB SERVER" of the security information 91 stored in the HDD 115 has not been updated after the reference date and time, the button 422 becomes valid. In the case where the security information that makes a set with the identification information "DB SERVER" of the security information 91 stored in the HDD 115 has been updated after the reference date and time, the button 422 becomes invalid. In the case where the security information that makes a set with the identification information "HDD ENCRYPTION" of the security information 91 stored in the HDD 115 has not been updated after the reference date and time, the button 423 becomes valid. In the case where the security information that makes a set with the identification information "HDD ENCRYPTION" of the security information 91 stored in the HDD 115 has been updated after the reference date and time, the button 423 becomes invalid. In the case where the security information that makes a set with the identification information "DATA ENCRYPTION" of the security information 91 stored in the HDD 115 has not been updated after the reference date and time, the button 424 becomes valid. In the case where the security information that makes a set with the identification information "DATA ENCRYPTION" of the security information 91 stored in the HDD 115 has been updated after the reference date and time, the button 424 becomes invalid.

Returning to FIG. 5, when the button 421 is designated in the stage where the process limitation screen 420 is displayed, the process execution portion 61 displays a pop-up screen for accepting the security information that makes a set with the identification information "MAIL SERVER". In response to acceptance of the security information, the process execution portion 61 closes the pop-up screen. When the button 422 is designated in the stage where the process limitation screen 420 is displayed, the process execution portion 61 displays a pop-up screen for accepting the security information that makes a set with the identification information "DB SERVER". In response to acceptance of the security information, the process execution portion 61 closes the pop-up screen. When the button 423 is designated in the stage where the process limitation screen 420 is displayed, the process execution portion 61 displays a pop-up screen for accepting the information that makes a set with the identification information "HDD ENCRYPTION". In response to acceptance of the security information, the process execution portion 61 closes the pop-up screen. When the button 424 is designated in the stage where the process limitation screen 420 is displayed, the process execution portion 61 displays a pop-up screen for accepting the information that makes a set with the identification information "DATA ENCRYPTION". In response to acceptance of the security information, the process execution portion 61 closes the pop-up screen.

In the case where executing the first process in accordance with an operation input in the operation unit 163 by the user who is authenticated by the authentication portion 57 or the authentication request portion 53, the process execution portion 61 updates the security information 91 stored in the HDD 115. The process execution portion 61 includes a preparation completion notification portion 63 and a holding portion 65. In the case where the first process is executed, in response to acceptance of the security information by the operation unit 163, the holding portion 65 does not update the security information 91 stored in the HDD 115, but temporarily stores the set of the security information accepted by the operation unit 163 and the identification information for identifying the security information in the RAM 114, and outputs a notification instruction to the preparation completion notification portion 63. The notification instruction includes the identification information of the security information temporarily stored in the RAM 114.

In response to reception of the notification instruction, the preparation completion notification portion 63 notifies the management server 200 of completion of the preparation. Specifically, the preparation completion notification portion 63 transmits a preparation completion signal to the management server 200 via the communication I/F unit 112. The preparation completion signal includes the identification information of the security information included in the notification instruction. In response to reception of the preparation completion signal including the same identification information from each of all of the MFPs 100, 100A to 100D, the management server 200 that receives the preparation completion signals gives an instruction to update the security information to each of the MFPs 100, 100A to 100D. Specifically, in response to reception of the preparation completion signal including the same identification information from each of all of the MFPs 100, 100A to 100D, the management server 200 transmits an update instruction including the identification information included in the preparation completion signal to each of the MFPs 100, 100A to 100D.

In the case where the communication I/F unit 112 receives the update instruction from the management server 200, the process execution portion 61 reads out the security information that makes a set with the identification information included in the update instruction from the RAM 114, and updates the security information, which makes a set with the identification information included in the update instruction, of the security information 91 stored in the HDD 115 with the security information read from the RAM 114. Thus, the security information can be updated at the same time in each of the MFPs 100, 100A to 100D.

Further, in response to reception of the preparation completion signal including the identification information of the security information stored in the service provision server 300 from each of all of the MFPs 100, 100A to 100D, the management server 200 outputs the update instruction to the service provision server 300. In response to reception of the update instruction, the service provision server 300 that receives the update instruction updates the security information. Thus, timing for updating the security information can be the same in all of the service provision server 300 and the MFPs 100, 100A to 100D included in the first group. Similarly, in response to reception of the preparation completion signal including the identification information of the security information stored in the service provision server 300A from each of all of the MFPs 100, 100A to 100D, the management server 200 outputs the update instruction to the service provision server 300A. In response to the reception of the update instruction, the service provision server 300A that receives the update instruction updates the security information. Thus, the timing for updating the security information can be the same in all of the service provision server 300A and the MFPs 100, 100A to 100D included in the second group.

The process execution portion 61 further executes an execution request process, an access process, an encryption process that are executed with the use of the security information set by the execution of the first process in accordance with an operation by the user who operates the MFP 100. The user referred to here is the user registered as the user who uses the MFP 100 regardless of the user being registered as the administrator in the MFP 100. Further, in the case where the user who uses the MFP 100 is not limited, users other than the user registered as the user who uses the MFP 100 are included.

The execution request process is a process of receiving a service provided by each of the service provision servers 300, 300A. The execution request process includes a process of transmitting the identification information "MAIL SERVER" registered as an account and the security information that makes a set with the identification information "MAIL SERVER" to the service provision server 300, and on the condition that authentication using the identification information "MAIL SERVER" and the security information performed by the service provision server 300 is successful, receiving the service provided by the service provision server 300. Thus, the process execution portion 61 updates the security information used for the process of receiving the service provided by the service provision server 300 by executing the first process.

Further, the execution request process includes a process of transmitting the identification information "DB SERVER" registered as an account and the security information that makes a set with the identification information "DB SERVER" to the service provision server 300A, and on the condition that authentication using the identification information "DB SERVER" and the security information performed by the service provision server 300A is successful, receiving a service provided by the service provision server 300A. Therefore, the process execution portion 61 updates the security information used for the process of receiving the service provided by the service provision servers 300, 300A by executing the first process. For example, it is effective in the case where the service provision server 300 successively fails the authentication a predetermined number of times or more, and then refuses to further perform authentication of the account. In the case where the update of the security information is delayed in at least one of the MFPs 100, 100A to 100D, that is, for example, the MFP 100A, if the MFP 100A transmits pre-update security information that is not updated to the service provision server 300 a predetermined number of times or more, each of the other MFPs 100, 100B to 100D cannot receive the service provided by the service provision server 300 although the security information has been updated in the other MFPs 100, 100B to 100D. Because the timing for updating the security information corresponding to the service provision server 300 is the same among the MFPs 100, 100A to 100D, an occurrence of this situation can be avoided.

Further, the access process includes a process of, on the condition that the security information received from any of the MFP 100A to 100D is the same as the security information assigned to the shared region of the HDD 115, allowing any of the MFP 100A to 100D to access the shared region in the HDD 115 of the MFP 100. Therefore, the security information used for the access process of allowing an access to the shared region of the HDD 115 of the MFP 100 can be updated in each of all of the MFPs 100, 100A to 100D.

Further, the encryption process includes a process of encrypting the data transmitted to any one of the MFPs 100A to 100D by using the security information or decrypting the data received from any one of the MFPs 100A to 100D by using the security information. Therefore, the security information used for the process of encrypting or decrypting can be updated in each of all of the MFPs 100, 100A to 100D.

Figure 10:
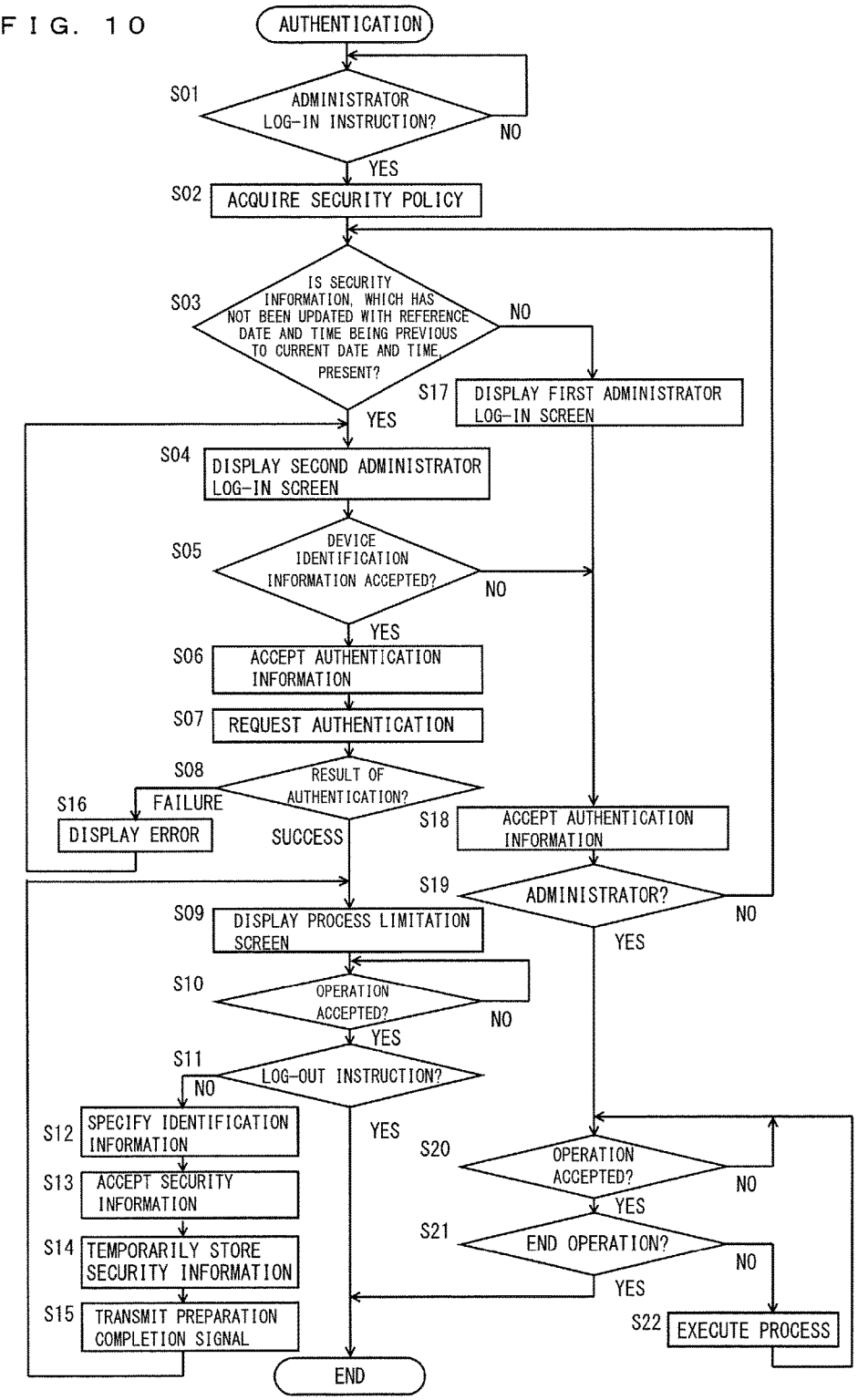
FIG. 10 is a flow chart showing one example of a flow of an authentication process in one or more embodiments of the invention.

FIG. 10 is a flow chart showing one example of a flow of an authentication process in one or more embodiments of the invention. The authentication process is part of the security information update process, and is a process executed by the CPU 111 in the case where the CPU 111 included in the MFP 100 executes the security information update program stored in the ROM 113, the HDD 115, or the CD-ROM 118. Referring to FIG. 10, the CPU 111 determines whether an administrator log-in instruction has been accepted (step S01). For example, in the case where the user accepts an operation of designating a hard key to which the administrator log-in instruction is assigned among the plurality of hard keys included the had key unit 167 of the operation unit 163, the administrator log-in instruction is accepted. The process waits until the administrator log-in instruction is accepted. If the administrator log-in instruction is accepted, the process proceeds to the step S02.

In the step S02, the security policy is acquired. When the CPU 111 controls the communication I/F unit 112 and requests the management server 200 to transmit the security policy, the communication I/F unit receives the policy table 291 from the management server 200. Then, the policy table 291 is acquired as the security policy.

In the next step S03, whether the security information, which has not been updated with the corresponding reference date and time being previous to the current date and time, is present is determined. Specifically, the CPU 111 extracts a policy record having the reference date and time, which current date and time have exceeded, with reference to the policy table 291 acquired in the step S02, and determines the identification information set in the item of the type of the extracted policy record. Then, if the security information of the determined identification information among the security information 91 stored in the HDD 115 has not been updated after the reference date and time, the security information is determined as the un-updated security information, which has not been updated with the corresponding reference date and time being previous to the current date and time. If the security information of the determined identification information has been updated after the reference date and time, the security information is determined as the updated security information, which has been updated with the corresponding reference date and time being previous to the current date and time. If the security information, which has not been updated with the corresponding reference date and time being previous to the current date and time, is present, the process proceeds to the step S04. If not, the process proceeds to the step S17.

In the step S04, the second administrator log-in screen is displayed in the display unit 161, and the process proceeds to the step S05. In the step S05, it is determined whether the operation unit 163 has accepted the device identification information. The device identification information is the information for identifying other MFPs 100A to 100D. If the device identification information is accepted, the process proceeds to the step S06. If not, the process proceeds to the step S17. In the step S06, the authentication information that is input in the operation unit 163 by the user is accepted. The authentication information is the administrator password. Then, in the step S07, the authentication request is transmitted to a device specified by the device identification information accepted in the step S05. The authentication request includes the authentication information accepted in the step S06, which is the administrator password in this case. The case where the device identification information of the MFP 100A is accepted is described here as an example. In this case, the CPU 111 transmits the authentication request to the MFP 100A via the communication I/F unit 112. The MFP 100A that receives the authentication request performs the authentication by using the authentication information included in the authentication request, and returns a result of authentication.

In the next step S08, the process branches based on the result of authentication received from the MFP 100A. In the case where the result of authentication indicates authentication success, the process proceeds to the step S09. If the result of authentication indicates authentication failure, the process proceeds to the step S16. In the step S16, an error message is displayed in the display unit 161, and the process returns to the step S04.

In the step S09, the process limitation screen shown in FIG. 9 is displayed in the display unit 161, and the process proceeds to the step S10. In the step S10, whether the operation unit 163 has accepted an operation is determined. The process waits until the operation is accepted. If the operation is accepted, the process proceeds to the step S11. The process limitation screen 420 includes the buttons 421 to 425, and is a screen in which an operation of designating the button 425 or any of the valid buttons among the buttons 421 to 424 can be accepted. If the security information that makes a set with the identification information "MAIL SERVER" of the security information 91 stored in the HDD 115 has not been updated after the reference date and time, the button 421 becomes valid. If the security information that makes a set with the identification information "MAIL SERVER" of the security information 91 stored in the HDD 115 has been updated after the reference date and time, the button 421 becomes invalid. If the security information that makes a set with the identification information "DB SERVER" of the security information 91 stored in the HDD 115 has been updated after the reference date and time, the button 422 becomes valid. If the security information that makes a set with the identification information "DB SERVER" of the security information 91 stored in the HDD 115 has been updated, the button 422 becomes invalid. If the security information that makes a set with the identification information "HDD ENCRYPTION" of the security information 91 stored in the HDD 115 has not been updated after the reference date and time, the button 423 becomes valid. If the security information that makes a set with the identification information "HDD ENCRYPTION" of the security information 91 stored in the HDD 115 has been updated after the reference date and time, the button 423 becomes invalid. If the security information that makes a set with the identification information "DATA ENCRYPTION" of the security information 91 stored in the HDD 115 has not been updated after the reference date and time, the button 424 becomes valid. If the security information that makes a set with the identification information "DATA ENCRYPTION" of the security information 91 stored in the HDD 115 has been updated after the reference date and time, the button 424 becomes invalid.

In the step S11, whether a log-out instruction has been accepted is determined. In the step S10, in the case where an operation of designating the button 425 is accepted in the step S10, a log-out instruction is accepted. If the log-out instruction is accepted, the process ends. If not, the process proceeds to the step S12.

In the step S12, the identification information is specified. In the case where an operation of designating the button 421 is accepted, the identification information "MAIL SERVER" is specified. In the case where an operation of designating the button 422 is accepted, the identification information "DB SERVER" is specified. In the case where an operation of designating the button 423 is accepted, the identification information "HDD ENCRYPTION" is specified. In the case where an operation of designating the button 424 is accepted, the identification information "DATA ENCRYPTION" is specified.

In the next step S13, a pop-up screen is displayed, the security information is accepted, and the process proceeds to the step S14. In the step S14, the accepted security information is temporarily stored in the RAM 114 together with the identification information specified in the step S12, and the process proceeds to the step S15. In the step S15, an update completion signal including the identification information specified in the step S12 is transmitted to the management server 200, and the process returns to the step S09.

On the one hand, in the step S17, the first administrator log-in screen shown in FIG. 6 is displayed in the display unit 161, and the process proceeds to the step S18. In the step S18, the authentication information that is input in the operation unit 163 by the user is accepted. The authentication information is the administrator password. Then, in the step S19, whether the user specified by the authentication information accepted in the step S16 is registered as an administrator is determined. Specifically, if the administrator password, which is same as the authentication information, is stored as the administrator data 93 of the HDD 115, it is determined that the user is registered as the administrator. If the administrator password is not stored as the administrator data 93, it is determined that the user is not registered as the administrator. If it is determined that the user is registered as the administrator, the process proceeds to the step S20. If not, the process returns to the step S03.

In the step S20, whether the operation unit 163 has accepted an operation is determined. The process waits until the operation is accepted. If the operation is accepted, the process proceeds to the step S21. In the step S21, whether the accepted operation is an end operation is determined. If the accepted operation is the end operation, the process ends. If the accepted operation is not the end operation, the process proceeds to the step S22. In the step S22, a process is executed in accordance with the operation accepted in the step S20, and the process returns to the step S20. The process referred to here includes the first process and the second process.

FIG. 11 is a flow chart showing one example of a flow of an update process in one or more embodiments of the invention. The update process is part of the security information update process, and is executed by the CPU 111 in the case where the CPU 111 included in the MFP 100 executes the security information update program stored in the ROM 113, the HDD 115 or the CD-ROM 118. Referring to FIG. 11, the CPU 111 determines whether the update instruction has been received from the management server 200 (step S31). The process waits until the update instruction is received. If the update instruction is received, the process proceeds to the step S32. In the step S32, the CPU 111 reads out the security information that makes a set with the identification information included in the update instruction from the security information stored in the RAM 114. Then, the security information identified by the identification information included in the update instruction is updated with the read security information (step S33), and the process ends. Specifically, the security information that makes a set with the identification information included in the update instruction of the security information 91 stored in the HDD 115 is overwritten with the security information read out from the RAM 114 in the step S32.

FIG. 12 is a flow chart showing one example of a flow of a proxy authentication process in one or more embodiments of the invention. The proxy authentication process is part of the security information update process, and is executed by the CPU 111 in the case where the CPU 111 included in the MFP 100 executes the security information update program stored in the ROM 113, the HDD 115, or the CD-ROM 118. Referring to FIG. 12, the CPU 111 determines whether the authentication request has been received (step S41). Whether the communication I/F unit 112 has received the authentication request from an external device is determined. The process waits until the authentication request is received from the external device. If the authentication request is received, the process proceeds to the step S42. The case where the authentication request is received from the MFP 100A is described here as an example.

In the step S42, the CPU 111 performs the authentication by using the administrator password included in the received authentication request and the administrator data 93. Specifically, if the administrator password, which is the same as the administrator password included in the authentication request, is stored as the administrator data 93 of the HDD 115, the external device is authenticated. If the same administrator password is not stored as the administrator data 93, the external device is not authenticated. In the next step S43, a result of authentication is returned to the device that has transmitted the authentication request received in the step S41, that is, the MFP 100A in this case, and the process ends. In the case where the authentication is successful, the result of authentication is the information indicating authentication success. In the case where the authentication fails, the result of authentication is the information indicating authentication failure.

As described above, in the security information update system 1 of the present embodiment, the user registered as the administrator in each of the MFPs 100, 100A to 100D can operate each of the MFPs 100, 100A to 100D and allow each of the MFP 100, 100A to 100D to execute any of the first process of updating the security information and the second process, which is other than the first process. For example, in the case where receiving a message indicating the update the security information to which the reference date and time, which the current date and time have passed, correspond from the management server 200, the user registered as the administrator in the MFP 100 can operate the MFP 100 and allow the MFP 100 to execute the first process of updating the security information.

Further, the management server 200 stores the policy table, which defines the identification information for identifying the security information, common among the plurality of information processing apparatus, and each of the MFPs 100, 100A to 100D acquires the policy table from the management server 200. As for each of the MFPs 100, 100A to 100D, that is, for example, the MFP 100 in this case, even in the case where the user who operates the MFP 100 is not registered as the administrator in the MFP 100, if the user is registered as an administrator in an external device, the MFP 100 executes the process of updating the security information, which has not been updated even though the current date and time have passed the reference date and time defined by the policy table, of the security information 91 stored in the HDD 115 in accordance with the operation by the user. For example, in the case where the user who is registered as the administrator in the MFP 100 and is not registered as the administrator in the MFP 100A operates the MFP 100A, if the user designates the MFP 100 and inputs the administrator password registered in the MFP 100, the user can be authenticated in the MFP 100A. In this case, the MFP 100A executes the first process of updating the security information stored in the MFP 100A. Therefore, even in the case where the administrator registered in the MFP 100A cannot operate the MFP 100A after the current date and time have passed the reference date and time of the security information due to being away and so on, the user registered as the administrator in the external device can operate the MFP 100A and update the security information. Thus, the security information can be updated as early as possible after the current date and time have passed the reference date and time defined by the security policy. Further, it is possible to increase the number of opportunities where the security information stored in each of the MFPs 100, 100A to 100D is updated without changing usage authority of the user registered as the administrator in each of the MFPs 100, 100A to 100D. For example, in the security information stored in the service provision server 300, the reference date and time are defined as the first of every month at 00:00 by the security table shown in FIG. 2. If the user registered as the administrator in the MFP 100 operates each of the MFPs 100, 100A to 100D after 00:00 on the first of every month and inputs the security information that is updated by the service provision server 300, the security information 91 stored in the HDD 115 of each of the MFPs 100, 100A to 100D is updated with the security information that is updated by the service provision server 300.

Further, because each of the MFPs 100, 100A to 100D updates only the security information specified by the identification information to which the reference date and time, which are defined by the security policy and the current date and time have passed, correspond, a period during which the security information can be updated can be limited.

Further, in the case where the user who operates the MFP 100 is registered as the administrator in the MFP 100, the MFP 100 displays the administrator setting screen in which the first process and the second process can be executed. In the case where the user who operates the MFP 100 is not registered as the administrator in the MFP 100, the MFP 100 displays the process limitation screen in which only the first process can be executed. Thus, the user can be notified of an executable process.

Further, the external device may be any of the other MFPs 100A to 100D, a portable information device such as a smartphone carried by the user, or a personal computer used by the user. Therefore, as long as the user who is not registered as the administrator in the MFP 100 is registered as the administrator in the external device, the user can update any of the security information.

Further, the security policy that defines the identification information for identifying security information commonly used among the MFPs 100, 100A to 100D is stored in the management server 200. The MFP 100 updates the security information specified by the identification information defined by the security policy acquired from the management server 200. Therefore, in the management server 200, the security information updated in each of the MFPs 100, 100A to 100D can be managed.

Further, for example, each of the MFPs 100, 100A to 100D temporarily stores the security information, which makes a set with the identification information "MAIL SERVER", input by the user registered as the administrator in the MFP 100 in the RAM 114, and in response to reception of the update instruction including the identification information "MAIL SERVER" from the management server 200, updates the security information, which makes a set with the identification information "MAIL SERVER", of the security information 91 stored in the HDD 115 with the security information, which makes a set with the identification information "MAIL SERVER", temporarily stored in the RAM 114. Thus, the timing for updating the same security information can be the same among the MFPs 100, 100A to 100D. Further, because the update instruction is also transmitted from the management server 200 to the service provision server 300, the timing for updating the same security information can be the same between the service provision server 300 and each of the MFPs 100, 100A to 100D.

First Modified Example

In the above-mentioned security information update system 1, the security information is updated after the current date and time have passed the reference date and time defined by the security policy. In a security information update system 1 of the first modified example, update date and time are defined by a policy table stored in the management server 200, and the security information is updated at the update date and time. Differences from the above-mentioned security information update system 1 will be mainly described.

FIG. 13 is a diagram showing one example of the policy table in one or more embodiments of the first modified example of the invention. Referring to FIG. 13, a difference of the policy table in the first modified example from the security table shown in FIG. 2 is that an item of the update date and time is added to the security record. Specifically, the security record includes the item of the type, the item of the reference date and time, and the item of the update date and time. In the item of the reference date and time, the date and the time at which the update of the security information is started are set. In the item of the update date and time, the date and time at which the security information is updated are set. The reference date and time are previous to the update date and time. A period from the reference date and time to the update date and time is a preparation period that includes the update date and time as an end point. In The security record in the first line, "EVERY MONTH, 1, 00:00" is set in the item of the reference date and time, and "EVERY MONTH, 2, 00:00" is set in the item of the update date and time. This means, with regard to the security information stored in the service provision server 300, that the updated security information is accepted from 00:00 on the first of every month, and the security information is updated at 00:00 on the second of every month, which is the following day. A period of 24 hours from 00:00 on the first of every month to 00:00 on the second of every month is the preparation period.

In the case where the identification information of the security information to which the reference date and time, which the current date and time have passed, correspond is present, the management server 200 transmits electronic mail that includes a message giving an instruction to update the security information, and the updated security information, and is addressed to the user who administers each of the service provision servers 300, 300A and the MFPs 100, 100A to 100D, for example.

Figure 14:
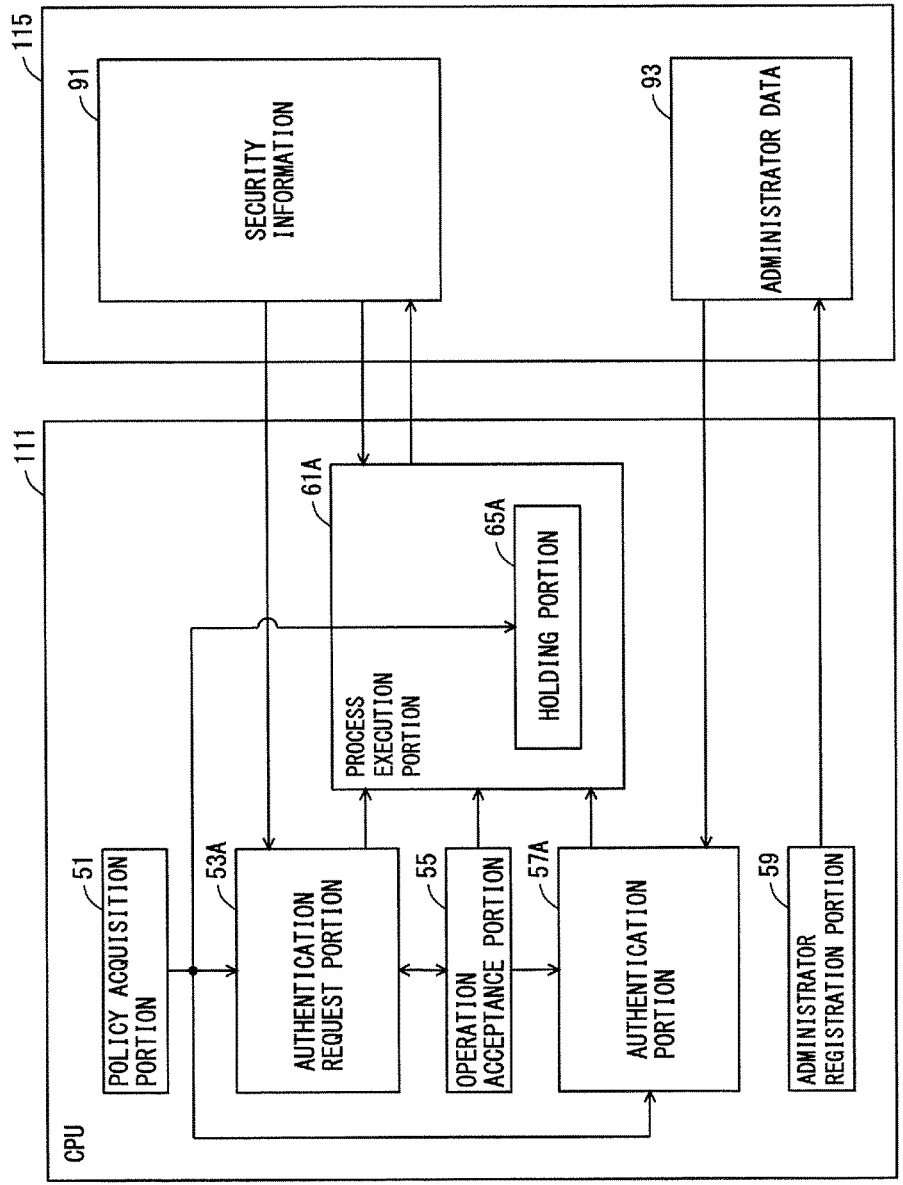
FIG. 14 is a block diagram showing one example of functions of a CPU included in an MFP in one or more embodiments of the first modified example together with information stored in an HDD.

FIG. 14 is a block diagram showing one example of functions of a CPU included in an MFP in one or more embodiments of the first modified example together with information stored in the HDD. Referring to FIG. 14, differences from the functions shown in FIG. 5 are that the authentication request portion 53, the authentication portion 57, and the process execution portion 61 are changed to an authentication request portion 53A, an authentication portion 57A, and a process execution portion 61A. The other functions are the same as the functions shown in FIG. 5. Thus, a description thereof is not repeated.

The authentication portion 57A performs the authentication of a user who operates the MFP 100. Specifically, the authentication portion 57A determines whether the security information for which the update preparation has not completed even though the current date and time have passed the reference date and time is present. Specifically, the authentication portion 57A extracts the policy record having the reference date and time, which the current date and time have exceeded, and determines the identification information set in the item of the type of the extracted policy record with reference to the policy table received from the policy acquisition portion 51. If the security information of the determined identification information is stored in the RAM 114, it is determined that the update preparation for the security information identified by the identification information is completed. If the security information of the determined identification information is not stored in the RAM 114, it is determined that the update preparation for the security information identified by the identification information is not completed. In the case where the security information for which the update preparation has not completed even through the current date and time have passed the reference date and time is not present, the authentication portion 57A displays the first administrator log-in screen shown in FIG. 6 in the display unit 161.

The authentication portion 57A accepts the administrator password input in the operation unit 163 in accordance with the first administrator log-in screen by the user who operates the operation unit 163 of the MFP 100. If the administrator password accepted by the operation unit 163 and the administrator data 93 are the same, the authentication portion 57A determines that the user is registered as the administrator and authenticates the user. If not, the authentication portion 57A does not authenticate the user. In the case where authenticating the user who operates the operation unit 163, the authentication portion 57A outputs execution permission indicating that the user has been authenticated to the process execution portion 61A.

Further, in the case where receiving an authentication request from any of the other MFPs 100A to MFP 100D, the authentication portion 57A performs the authentication of the user. The case where the authentication portion 57A receives the authentication request from the MFP 100A is described here as an example. When the authentication portion 57A receives the authentication request from the MFP 100A, if the administrator password included in the authentication request and the administrator data 93 are the same, the authentication portion 57A authenticates the user who operates the MFP 100A as the user registered as the administrator in the MFP 100. If not, the authentication portion 57A does not authenticate the user who operates the MFP 100A as the user registered as the administrator in the MFP 100. In the case where performing the authentication based on the authentication request, the authentication portion 57A transmits a result of authentication to the MFP 100A that has transmitted the authentication request via the communication I/F unit 112.

The authentication request portion 53A performs the authentication of the user who operates the MFP 100. Specifically, the authentication request portion 53A determines whether the security information for which the update preparation has not completed even though the current date and time have passed the reference date and time is present with reference to the policy table received from the policy acquisition portion 51. In the case where the security information for which the update preparation has not completed even though the current date and time have passed the reference date and time is present, the authentication request portion 53A displays the second administrator log-in screen shown in FIG. 7 in the display unit 161.

The authentication request portion 53A accepts the device identification information for identifying the external device and the administrator password that are input in the operation unit 163 in accordance with the second administrator log-in screen 410 by the user who operates the MFP 100, and transmits the authentication request to the external device specified by the device identification information accepted by the operation unit 163. The authentication request includes the administrator password accepted by the operation unit 163. The external device is a device in which the user who operates the MFP 100 is registered as the administrator. The external device only has to be the device in which the user who operates the MFP 100 is registered as the administrator, and is a portable information device such as a smartphone carried by the user who operates the MFP 100, a personal computer used by the user who operates the MFP 100 or the like in addition to each of the MFPs 100, 100A to 100D.

For example, in the case where displaying the second administrator log-in screen 412, and accepting the device identification information of the MFP 100A, the authentication request portion 53A controls the communication I/F unit 112 and transmits the authentication request to the MFP 100A. The MFP 100A that receives the authentication request determines whether the user is the administrator registered in the MFP 100A by using the administrator password included in the authentication request, and returns a result of authentication. Thus, the authentication request portion 53A acquires the result of authentication received by the communication I/F unit 112 from the MFP 100A. In the case where the result of authentication indicates authentication success, the authentication request portion 53A outputs the execution permission indicating that the user has been authenticated by another device to the process execution portion 61A. In the case where the result of authentication indicates authentication failure, the authentication request portion 53A does not output the execution permission to the process execution portion 61A.

In response to input of an operation by the operation acceptance portion 55 after the reception of the execution permission from the authentication portion 57A, the process execution portion 61A executes a process corresponding to the operation. In the case where the execution permission is input from the authentication portion 57A, and then an operation is accepted by the operation acceptance portion 55, the process execution portion 61A executes the first process or the second process. In the case where the execution permission is received from the authentication request portion 53A, and then an operation is accepted by the operation acceptance portion 55, the process execution portion 61A executes only the first process. Even after the execution permission is received from the authentication request portion 53, the process execution portion 61A does not execute the second process. Specifically, the process execution portion 61A displays the process limitation screen, which is shown in FIG. 9, for accepting only the execution of the first process in the display unit 161, and executes the first process in accordance with the operation performed by the user in accordance with the process limitation screen and accepted by the operation unit 163.

In the case where executing the first process in accordance with an operation input in the operation unit 163 by the user who is authenticated by the authentication portion 57A or the authentication request portion 53A, the process execution portion 61A updates the security information 91 stored in the HDD 115. The process execution portion 61A includes a holding portion 65A. In the case where executing the first process, in response to acceptance of the security information by the operation unit 163, the holding portion 65A does not update the security information stored in the HDD 115, and temporarily stores the security information accepted by the operation unit 163 in the RAM 114.

The process execution portion 61A reads out the security information to which the update date and time, which the current date and time have passed, correspond from the RAM 114 with reference to the security table acquired by the policy acquisition portion 51, and updates the security information to which the update date and time, which the current date and time have passed, correspond among the security information 91 stored in the HDD 115. Thus, the security information can be updated at the same time in each of the MFPs 100, 100A to 100D.

In each of the MFPs 100, 100A to 100D in the first modified example, a process similar to the process excluding the step S15 is executed in the authentication process shown in FIG. 10.

Figure 15:
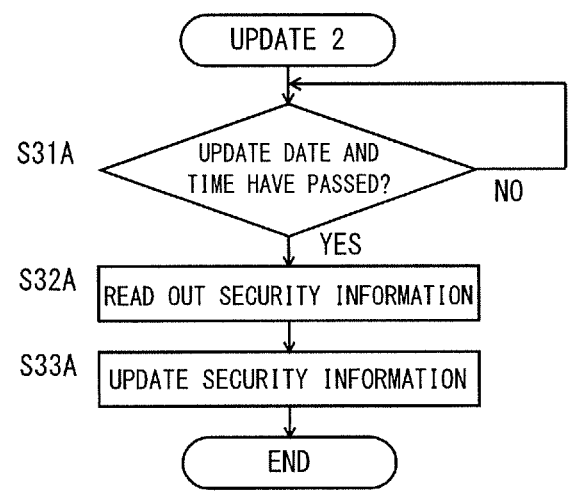
FIG. 15 is a flow chart showing one example of a flow of an update process in one or more embodiments of the first modified example.

FIG. 15 is a flow chart showing one example of a flow of an update process in one or more embodiments of the first modified example. The update process in the first modified example is part of the security information update process, and executed by the CPU 111 in the case where the CPU 111 included in the MFP 100 executes the security information update program stored in the ROM 113, the HDD 115 or the CD-ROM 118. Referring to FIG. 15, the CPU 111 determines whether the security information identified by the identification information to which the update date and time, which the current date and time have passed, correspond is present with reference to the security table (step S31A). If the security information identified by the identification information to which the update date and time, which the current date and time have passed, correspond is present, the process proceeds to the step S32A. If not, the process returns to the step S31A. In the step S32A, the CPU 111 reads out the security information, which makes a set with the identification information that is the same as the identification information to which the update date and time, which the current date and time have passed, correspond from the sets of the identification information and the security information stored in the RAM 114. Then, the CPU 111 updates the security information identified by the identification information to which the update date and time, which the current date and time have passed, correspond among the security information 91 stored in the HDD 115 with the security information that is read in the step S32A (step S33A), and the process ends.

As described above, in the security information update system 1 of the first modified example, the following effect can be achieved in addition to the effect achieved by the security information update system 1 of the above-mentioned embodiment. The user registered as the administrator in any of the MFPs 100, 100A to 100D can operate any of the MFPs 100, 100A to 100D, and input an operation of updating the security information to which the reference date and time, which are defined by the security policy and the current date and time have passed, correspond. In response to acceptance of the operation of updating the security information by the user registered as an administrator in any of the MFPs 100, 100A to 100D, each of the MFPs 100, 100A to 100D temporarily stores the updated security information in the RAM 114. Then, in each of the MFPs 100, 100A to 100D, when the update date and time defined by the security policy arrive after the updated security information is temporarily stored in the RAM 114, the security information 91 stored in the HDD 115 is updated with the security information temporarily stored in the RAM 114. Therefore, the security information of the same type among the MFPs 100, 100A to 100D can be updated at the update date and time defined by the security policy in all of the MFPs 100, 100A to 100D, and the timing for updating the security information can be the same in all of the MFPs 100, 100A to 100D.

Further, in each of the MFPs 100, 100A to 100D, the security information, which is accepted during the preparation period from the reference date and time to the update date and time respectively defined by the security policy, is temporarily stored, so that the period during which the security information can be accepted can be limited, and an operational error can be prevented.

Second Modified Example

In the above-mentioned security information update system 1, the security policy defined by the management server 200 includes the policy table that associates the identification information indicating the type of the security information with the reference date and time. In the security information update system 1 of the second modified example, a request device table that defines the external device capable of requesting authentication is included in the security policy in addition to the security table.

In the second modified example, the request device table defines a group of devices that store the security information of the same type. In the above-mentioned security update system 1, the pieces of the security information respectively corresponding to the four pieces of the identification information "MAIL SERVER", "DB SERVER, "HDD ENCRYPTION" and "DATA ENCRYPTION" defined by the security table shown in FIG. 2 are stored in each of the MFPs 100, 100A to 100D. Therefore, the request device table included in the security policy in the second modified example includes the device identification information of each of the MFPs 100, 100A to 100D.

The functions included in the CPU 111 of the MFP 100 in the second modified example are the same as the functions shown in FIG. 5 except for the authentication request portion 53. The authentication request portion 53 in the second modified example performs the authentication of the user who operates the MFP 100. Specifically, the authentication request portion 53 determines whether the security information that has not been updated even though the current date and time have passed the update date and time is present with reference to the policy table received from the policy acquisition portion 51. In the case where the security information that has not been updated even though the current date and time have passed the update date and time is present, the authentication request portion 53 displays the second administrator log-in screen shown in FIG. 7 in the display unit 161.

The authentication request portion 53 accepts the device identification information for identifying the external device and the administrator password that are input in the operation unit 163 in accordance with the second administrator log-in screen 410 by the user who operates the MFP 100. At this time, the authentication request portion 53 determines whether the device identification information accepted by the operation unit 163 matches any of the pieces of the device identification information of each of the MFPs 100, 100A to 100D included in the request device table with reference to the request device table received from the management server 200 as the security policy. The authentication request portion 53, on the condition that the device identification information accepted by the operation unit 163 matches any of the pieces of the device identification information of each of the MFPs 100, 100A to 100D included in the request device table, transmits the authentication request to the device specified by the device identification information accepted by the operation unit 163. The authentication request includes the administrator password accepted by the operation unit 163.

For example, in the case where the user registered as the administrator in the MFP 100A operates the MFP 100, the authentication request portion 53 displays the second administrator log-in screen 412. When the user registered as the administrator in the MFP 100A inputs the device identification information of the MFP 100A and the administrator password registered in the MFP 100A in the operation unit 163, the authentication request portion 53 transmits the authentication request including the input administrator password to the MFP 100A via the communication I/F unit 112.

In the second modified example, because the MFP 100 receives the request device table as the security policy from the management server 200, the authentication request portion 53 limits the device to which the notification is requested to the device that stores the same security information identified by the identification information. The device to which the authentication request portion 53 requests authentication is any of the MFPs 100A to 100D in this case. Thus, the security can be increased.

In the second modified example, one request device table is defined for one policy table. However, the request device table may be defined to correspond to each of the plurality of policy records included in the one policy table, in other words, may be defined to correspond to each of the plurality of pieces of identification information. Therefore, the device to which the authentication can be requested is defined for every security information, so that the user having the authority to update the security information can be limited for each security information. Thus, the security can be increased.

Further, for each of the MFPs 100, 100A to 100D, the request device table may define the device to which the authentication can be requested as a specified device. For example, the request device table may define a specified device which stores the security information of the same type as the type of the security information stored in the MFP 100 among the other MFPs 100A to 100D. Thus, the user having the authority to update the security information can be further limited, and the security can be increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A security information management system comprising:
   a plurality of information processing apparatus including at least a first information processing apparatus and a second information processing apparatus, wherein
   each of the plurality of information processing apparatus comprises:
   an operation panel that accepts an operation by a user;
   a storage that stores security information; and
   a hardware processor, wherein
   the hardware processor of each of the information processing apparatus:
   registers an administrator of the first information processing apparatus,
   when a user who operates the operation panel is registered as the administrator, authenticates the user,
   when the user is authenticated, executes a first process of updating any of the stored security information and a second process of setting the first information processing apparatus in accordance with an operation that is performed by the authenticated user and accepted by the operation panel, and
   when the user is not registered as the administrator of the first information processing apparatus and is authenticated as an administrator of the second information processing apparatus, executes the first process but not the second process.

2. The security information management system according to claim 1, wherein
   the hardware processor of each of the information processing apparatus further:
   when the user is registered as the administrator of the first information processing apparatus, displays a first screen for starting the first process and the second process, and
   when the user is not registered as the administrator of the first information processing apparatus and is registered as the administrator in the second information processing apparatus, displays a second screen for starting the first process but not the second process.

3. The security information management system according to claim 1, wherein
   the hardware processor of each of the information processing apparatus further:
   when the user is not registered as the administrator of the first information processing apparatus and is authenticated as an administrator in an external device in which the administrator is registered, executes the first process but not the second process.

4. The security information management system according to claim 1, wherein
   the hardware processor of each of the information processing apparatus further:
   registers the second information processing apparatus in advance as a device at another end of communication.

5. The security information management system according to claim 1, further comprising a management server, wherein
   the management server stores a security policy that defines identification information for identifying security information commonly used among the plurality of information processing apparatus, and
   the hardware processor of each of the information processing apparatus further:
   acquires the security policy from the management server, and executes a process of updating the security information specified by the identification information, as the first process.

6. The security information management system according to claim 5, wherein
the security policy further defines reference date and time in correspondence with the identification information, and
the hardware processor of each of the information processing apparatus further:
executes a process of updating the security information specified by the identification information corresponding to the reference date and time that is earlier than current date and time, as the first process.

7. The security information management system according to claim 6, wherein
the hardware processor of each of the plurality of information processing apparatus, further:
in response to the acceptance by the operation panel of the security information specified by the identification information, temporarily stores the accepted security information, and
in response to the temporary storage of the security information, notifies the management server of completion of update preparation,
the management server, in response to reception of the notification of the completion from each of the plurality of information processing apparatus, gives an instruction to each of the plurality of information processing apparatus to perform the update, and
the hardware processor, in response to the instruction from the management server, further updates the security information specified by the identification information with the temporarily stored security information.

8. The security information management system according to claim 5, wherein
the security policy, in correspondence with the identification information, further defines update date and time at which the security information specified by the identification information is updated,
the hardware processor of each of the information processing apparatus further:
in response to acceptance of the security information specified by the identification information before the update date and time, temporarily stores the accepted security information, and
in response to current date and time reaching the update date and time, updates the security information specified by the identification information with the temporarily stored security information.

9. The security information management system according to claim 8, wherein
the security policy further defines a preparation period that includes the update date and time as an end point in correspondence with the identification information, and
the hardware processor of each of the information processing apparatus further:
when the security information specified by the identification information is accepted by the operation panel during the preparation period, temporarily stores the accepted security information.

10. The security information management system according to claim 1, wherein
the hardware processor of each of the information processing apparatus further:
transmits security information corresponding to a service provision server among the security information stored in the storage to the service provision server, and
when authentication using the security information performed by the service provision server is successful, further executes an execution request process of receiving a service provided by the service provision server.

11. The security information management system according to claim 1, wherein
the hardware processor of each of the information processing apparatus further:
when externally input security information is same as security information corresponding to an access process of accessing the storage among the security information stored in the storage, executes the access process.

12. The security information management system according to claim 1, wherein
the hardware processor of each of the information processing apparatus further:
executes a process of encrypting data transmitted to and a process of decrypting data received from the second information processing apparatus using predetermined security information among the stored security information.

13. An information processing apparatus comprising:
an operation panel that accepts an operation by a user;
a storage that stores security information; and
a hardware processor, wherein
the hardware processor:
registers an administrator;
when a user who operates the operation panel is registered as the administrator, authenticates the user;
when the user is authenticated, executes a first process of updating any of the stored security information, and a second process of setting the information processing apparatus in accordance with an operation that is performed by the authenticated user and accepted by the operation panel; and
when the user is not registered as the administrator and is authenticated as an administrator of another information processing apparatus, executes the first process but not the second process.

14. The information processing apparatus according to claim 13, wherein
the hardware processor,
when the user is registered as the administrator, displays a first screen for starting the first process and the second process, and
when the user is not registered as the administrator of the information processing apparatus and is registered as the administrator in the other information processing apparatus, displays a second screen for starting the first process but not the second process.

15. The information processing apparatus according to claim 13, wherein
when the user is not registered as the administrator of the information processing apparatus and is authenticated as an administrator of an external device in which the administrator is registered, the hardware processor further executes the first process but not the second process.

16. The information processing apparatus according to claim 13, wherein the hardware processor registers the other information processing apparatus in advance as a device at another end of communication.

17. The information processing apparatus according to claim 13, wherein
the hardware processor
acquires a security policy that defines identification information for identifying security information commonly used with the other information processing apparatus, and
executes a process of updating the security information specified by the identification information as the first process.

18. The information processing apparatus according to claim 17, wherein
the security policy further defines reference date and time in correspondence with the identification information, and
the hardware processor executes a process of updating the security information specified by the identification information corresponding to the reference date and time that is earlier than current date and time, as the first process.

19. The information process apparatus according to claim 18, wherein
the hardware processor,
in response to acceptance by the operation panel of the security information specified by the identification information, temporarily stores the accepted security information, and
in response to the temporary storage of the security information, transmits a preparation completion notification that corresponds to the specified security information to a management server,
in response to reception of an update instruction transmitted by the management server, updates the specified security information corresponding to the update instruction among the stored security information with the temporarily stored security information, wherein
the update instruction corresponds to the identification information,
the update instruction is transmitted by the management server to each of a plurality of devices in response to reception of the preparation completion notification from each of the devices, including the information processing apparatus, that store the specified security information,
the preparation completion notification corresponds to the identification information, and
the devices include the hardware processor.

20. A non-transitory computer-readable recording medium encoded with a security information update program executed by a hardware processor that controls an information processing apparatus, wherein the information processing apparatus includes an operation panel that accepts an operation by a user; and a storage that stores security information, the security information update program causing the hardware processor to execute:
registering an administrator;
when a user who operates the operation panel is registered as an administrator, authenticating the user;
when the user is authenticated, executing a first process of updating any of the stored security information, and a second process of setting the information processing apparatus in accordance with an operation that is performed by the authenticated user and accepted by the operation panel; and
when the user is not registered as the administrator and is authenticated as an administrator of another information processing apparatus, executing the first process but not the second process.

* * * * *